L. D. EVANS.
FISHING SIGNALING APPARATUS.
APPLICATION FILED AUG. 14, 1916.
1,220,617.
Patented Mar. 27, 1917.
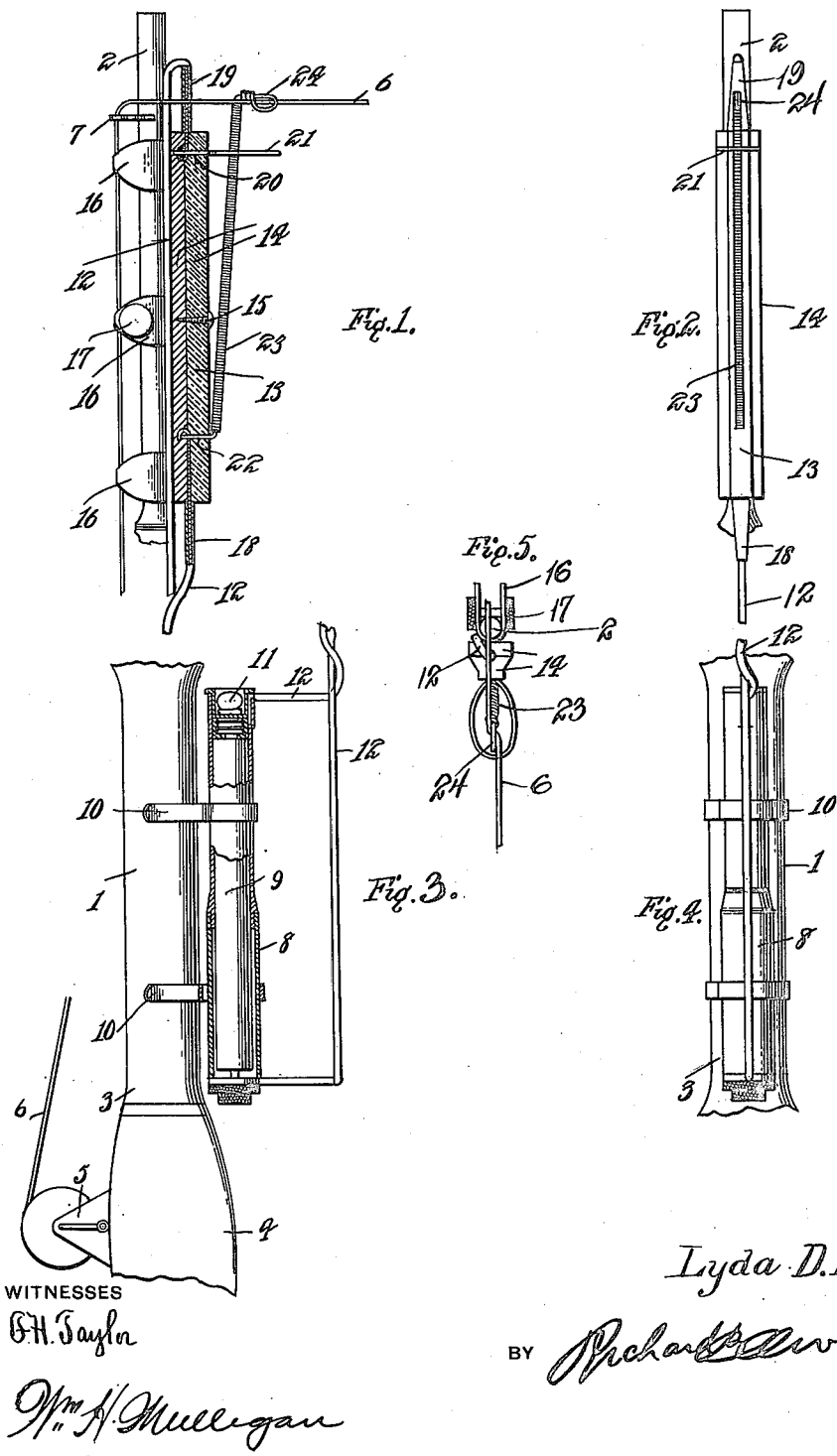
INVENTOR
Lyda D. Evans.
WITNESSES
BY
ATTORNEY

UNITED STATES PATENT OFFICE.

LYDA D. EVANS, OF HEARNE, TEXAS.

FISHING SIGNALING APPARATUS.

1,220,617. Specification of Letters Patent. Patented Mar. 27, 1917.

Application filed August 14, 1916. Serial No. 114,812.

*To all whom it may concern:*

Be it known that I, LYDA D. EVANS, a citizen of the United States, residing at Hearne, in the county of Robertson and State of Texas, have invented certain new and useful Improvements in Fishing Signaling Apparatus, of which the following is a specification.

This invention relates to a fishing signaling apparatus and more particularly to an attachment for a fishing pole and fishing line for use while fishing at night and adapted to operate a signal carried near the butt-end of the pole for indicating a "strike" by the fish at the end of the line.

The primary object is to provide an electric light adapted to be illuminated when a fish "strikes" while using the device in the night time.

A further object of the invention is to provide a signaling apparatus adapted to be mounted upon a fishing pole and coöperating with the fishing line in such a manner as to energize an electric circuit for operating the signal to indicate when a fish "strikes" the line.

It is well known among anglers that the sport of fishing for game fish in the night time is greatly dampened by the fact that it is difficult to see the fish "strike" the fishing line when the night is very dark and it is for the purpose of overcoming this difficulty that the herein described signaling attachmnet is devised.

Another one of the objects, therefore, is the provision of a signaling device which may be quickly attached to or detached from an ordinary fish pole and be constructed to require a minimum amount of space whereby the proper manipulation of the fishing pole will not be retarded in any manner.

A further object of this invention is the provision of a fishing signaling device which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a side elevation of the small end of a fish pole showing a part of the attachment applied thereto.

Fig. 2 is an edge elevation of the same.

Fig. 3 is a side elevation of the butt-end of a fishing pole showing the remaining portion of the device attached thereto.

Fig. 4 is an edge elevation of the same.

Fig. 5 is an end view of the small end of the pole showing the circuit closing mechanism in position.

Referring to the drawing wherein is illustrated the preferred form of my invention and wherein like characters of reference designate corresponding parts throughout the several views, the numeral 1 indicates the fishing pole having the small end 2 and the butt-end 3 to which is attached the handle 4 carrying the reel 5. The reel 5 carries the fishing line 6 which, of course, runs to the small end of the pole and passes through an eye loop 7 and off to one side of the pole where its extreme end carries the fly or bait (not shown). Mounted on the butt 3 adjacent the handle 4 is a casing 8 of cylindrical formation on the interior of which is arranged a battery 9. The casing 8 is detachably secured to the butt 3 by a pair of clips 10 or other suitable fastening members. Within one end of the casing 8 is mounted an electric light 11 having contact with the battery 9 in the usual manner. To the poles of the battery 9 is connected the circuit wires 12 which extend along the pole to the upper end thereof where they are connected to the circuit closing device 13 carried by the small end of the pole.

Mounted on the small end 2 of the pole is a pair of insulating plates 14 which are fastened together by the fastening elements 15 and detachably clamped to the pole by the clamps 16 one of which carries a clamping bolt 17 for preventing the accidental displacement of the plates. Projecting from one end of the plates 14 is a contact point or terminal 18 to which is secured one of the wires 12 from the battery 9. The opposite end of the insulating plates 14 also carries a contacting terminal 19 to which the wire 12 from the battery 9 is connected. Through an aperture 20 in one of the plates 14 is projected the shank of an eye loop 21 which is in contact with the end of the terminal 19 and the eye loop extends outwardly at right angles to the plate 14 as clearly shown by Figs. 1 and 5 of the drawing. Adjacent the opposite end of the outer plate 14 is another aperture 22 which receives one end of a coil spring 23 whereby the end of the spring will contact with the contact point or terminal 18. The opposite end of the spring 23 is formed with an eye loop 24 through which the fishing line 6 passes when the pole is held in position for catching a fish. Both of the members 21 and 23 are formed of copper or other suitable conductive material for closing the electric circuit when the coil spring 23 is moved into contact with any point on the loop 21.

When the angler is using the pole with the attachment applied thereto, it is unnecessary for him to watch the line to observe a "strike" because, as soon as the fish "strikes," the line, passing through the loop 24, will cause the coil spring 23 to move into engagement with the loop 21 thereby closing the circuit in the wires 12 and illuminating the signal light 11. Thereupon, the angler quickly manipulates his pole in the usual manner for hooking or catching the fish.

From the foregoing it will be observed that a very simple and durable fishing signaling apparatus has been provided, the details of which embody the preferred form. I desire it to be understood however, that slight changes in the minor details of construction may be made without departing from the spirit of the invention or the scope of the claims hereunto appended.

I claim:

1. In a fishing signaling apparatus comprising, in combination with a fishing pole and a fishing line, a source of current and an electric light mounted on the butt-end of the pole, contact points carried by the small end of the pole, conductors connected to the contact points and adapted to coöperate with the fishing line for closing the circuit formed by the said conductors whereby the said light may be energized, the said means including a loop for receiving a portion of the line whereby each vibration of the said line is transmitted to the said means.

2. In a fishing signaling apparatus, the combination with a fishing pole and a fishing line, the said line diverging at right angles from the small end of the pole, a signal light and a source of current coöperating therewith arranged at the butt-end of the pole, contact points carried by the small end of the pole and insulated therefrom, a loop projecting at right angles from the pole and connected to one of the contact points, and a coil spring having one end connected to the opposite contact point and its opposite end associated with the said diverging portion of the fishing line, the said spring being projected from the said loop whereby a movement of the said line will cause the said spring to contact with the loop.

3. In a fishing signaling apparatus comprising, in combination with a fishing pole and a fishing line, a source of current and an electric light mounted upon the butt-end of the pole, a pair of insulating plates carried by the small end of the pole, contact points carried by the plates, the proximate faces of the said plates being engaged for holding the contact points at opposite ends of the plates, conductors connected to the source of current and to both of the said contact points, and means connected to the contact points and adapted to coöperate with the fishing line for closing the circuit formed by the said conductors whereby the said light may be energized.

4. In a fishing signaling apparatus comprising, in combination with a fishing pole and a fishing line, a source of current and an electric light mounted upon the butt-end of the pole, a pair of insulating plates carried by the small end of the pole, contact points carried by the plates, the proximate faces of the said plates being engaged for holding the contact points at opposite ends of the plates, conductors connected to the source of current and to both of the said contact points, an eye loop extending through the said plates and connected to one of the said contact points, the looped portion being disposed at right angles to the plates, and a resilient element connected to the opposite contact point and extended through the loop for coöperation with the fishing line whereby a movement of the fishing line will cause the said resilient element to contact with the loop.

5. In a fishing signaling apparatus comprising, in combination with a fishing pole and a fishing line, a source of current and an electric light mounted upon the butt-end of the pole, a pair of insulating plates carried by the small end of the pole, contact points carried by the plates, the proximate faces of the said plates being engaged for holding the contact points at opposite ends of the plates, conductors connected to the source of current and to both of the said contact points, an eye loop extending through the said plates and connected to one of the said contact points, the looped portion being disposed at right angles to the plates, a coil spring having one end projected through the plates and connected to the opposite contact point, and a loop formed at the opposite end of the spring and associated with the said fishing line, the said spring being projected through the said loop.

In testimony whereof I affix my signature in presence of two witnesses.

LYDA D. EVANS.

Witnesses:
P. A. MAY,
J. NEW.